United States Patent
Derryberry et al.

(10) Patent No.: US 7,764,966 B2
(45) Date of Patent: Jul. 27, 2010

(54) METHOD AND APPARATUS FOR SWITCHING MOBILE STATION BETWEEN AUTONOMOUS AND SCHEDULED TRANSMISSIONS

(75) Inventors: R. Thomas Derryberry, Plano, TX (US); Liangchi Hsu, San Diego, CA (US); Mark W. Cheng, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/559,919

(22) PCT Filed: Jun. 27, 2003

(86) PCT No.: PCT/IB03/02523

§ 371 (c)(1),
(2), (4) Date: Dec. 7, 2005

(87) PCT Pub. No.: WO2004/110081

PCT Pub. Date: Dec. 16, 2004

(65) Prior Publication Data

US 2006/0128410 A1     Jun. 15, 2006

(51) Int. Cl.
*H04W 72/00* (2009.01)
*H04W 4/00* (2009.01)
*H04J 3/16* (2006.01)

(52) U.S. Cl. .................. 455/450; 455/452.2; 370/329; 370/437

(58) Field of Classification Search .............. 455/452.2, 455/457, 515, 452.1, 442, 436, 435.1, 524, 455/435.3, 450, 517, 453, 561; 370/468, 370/443, 437, 232, 235, 329
See application file for complete search history.

(56) References Cited

U.S. PATENT DOCUMENTS

| | | | |
|---|---|---|---|
| 5,873,047 A | 2/1999 | Nakano et al. | 455/561 |
| 6,272,124 B1 | 8/2001 | Ahn et al. | 370/342 |
| 6,453,151 B1 | 9/2002 | Kiang et al. | 455/67.1 |
| 6,469,993 B1 * | 10/2002 | Seo et al. | 370/329 |
| 6,836,666 B2 * | 12/2004 | Gopalakrishnan et al. | 455/452.2 |
| 6,993,342 B2 * | 1/2006 | Kuchibhotla et al. | 455/450 |
| 7,158,504 B2 * | 1/2007 | Kadaba et al. | 370/348 |
| 2002/0172217 A1 * | 11/2002 | Kadaba et al. | 370/443 |
| 2003/0039267 A1 * | 2/2003 | Koo et al. | 370/465 |
| 2003/0060208 A1 | 3/2003 | Achour et al. | 455/450 |

(Continued)

OTHER PUBLICATIONS

Motorola, "Management of Enhanced UPlink Scheduling Modes", 3 GPP RAN1 #32, R1030477, May 2003, 5 pgs.

(Continued)

*Primary Examiner*—George Eng
*Assistant Examiner*—Brandon J Miller
(74) *Attorney, Agent, or Firm*—Harrington & Smith

(57) ABSTRACT

Disclosed is a method for operating a mobile station with a base station, as well as apparatus for performing this method. The method includes, when the mobile station is in an Autonomous mode of operation, autonomously transmitting from the mobile station to the base station of a reverse access channel or a reverse supplemental channel (Transition 3); in response to receiving an acknowledgement indication from the base station, that comprises a reverse channel assignment message for the mobile station, switching the mobile station to a Scheduled mode of operation (Transition 4) and transmitting data from the mobile station on an assigned reverse channel.

39 Claims, 4 Drawing Sheets

U.S. PATENT DOCUMENTS

| | | | |
|---|---|---|---|
| 2003/0125037 A1* | 7/2003 | Bae et al. | 455/450 |
| 2004/0219919 A1* | 11/2004 | Whinnett et al. | 455/442 |
| 2004/0223455 A1* | 11/2004 | Fong et al. | 370/229 |
| 2004/0240416 A1* | 12/2004 | Derryberry et al. | 370/335 |
| 2005/0239413 A1* | 10/2005 | Wiberg et al. | 455/69 |
| 2006/0023629 A1* | 2/2006 | Kim et al. | 370/235 |
| 2006/0083161 A1* | 4/2006 | Laroia et al. | 370/208 |

OTHER PUBLICATIONS

Nortel Networks, "Reverse Link Enhancement for cdma2000 Release D Description (Update)", 3GPP2 TSG-C Contribution, C30-20030512-050, May 2003, 31 pgs.

* cited by examiner

METHOD AND APPARATUS FOR SWITCHING MOBILE STATION BETWEEN AUTONOMOUS AND SCHEDULED TRANSMISSIONS

TECHNICAL FIELD

This invention relates generally to mobile wireless communication systems and, more specifically, relates to methods and apparatus for operating a mobile station, such as a cellular telephone, with a base station when sending data on a reverse channel from the mobile station to the base station in a cdma2000-type system.

BACKGROUND

In a data communications system where a transmission resource is shared by multiple users, or where the transmission quality of a user can be affected by another user, there are generally two modes of channel operation. These may be referred to generally as an autonomous mode and as a scheduled mode. The autonomous mode does not necessarily require a resource request-grant relationship between the transmitters and the receiver prior to a communication, while the scheduled mode requires the presence of an arbiter of some type (e.g., at the receiver) to authorize and/or schedule transmissions for the multiple transmitters.

Each mode of operation has its advantages and its disadvantages. For example, the autonomous mode is well suited for small packet or circuit-like transmissions, while the scheduled mode is well suited for latency-insensitive transmissions.

For the cdma2000 1xEV-DV (or cdma2000, Revision D) reverse link framework, it is desirable to support both the autonomous mode and the scheduled mode of operation for the Reverse Supplemental Channel (R-SCH). However, many technical issues need to be resolved to make the autonomous and scheduled modes mutually compatible. For example, in order to operate these two modes alternatively, one important issue concerns how to best transition between the two modes.

Efforts have begun to standardize a complementary uplink structure, Enhanced Uplink Packet Access (EUPA) in 3GPP, to 1xEV-DV Revision D in 3GPP2. However, at present there is no provision for transitioning a mobile station between the autonomous and the scheduled transmission modes.

As a result, as presently specified the base station may not know, at any given time, when the mobile station needs to transmit data in the packet data system.

SUMMARY OF THE PREFERRED EMBODIMENTS

The foregoing and other problems are overcome, and other advantages are realized, in accordance with the presently preferred embodiments of these teachings.

It is an aspect of this invention to define a procedure to accomplish a scheduled switching mode for transitioning a mobile station between the autonomous transmission mode and the scheduled transmission mode.

Disclosed is a method for operating a mobile station with a base station, as well as apparatus for performing the method. The method includes, when the mobile station is in an Autonomous mode of operation, autonomously transmitting data from the mobile station to the base station on a reverse supplemental channel or a reverse access channel (e.g. R-EACH) from the mobile station to the base station; in response to receiving an acknowledgment indication from the base station, that comprises a reverse channel assignment message for the mobile station, switching the mobile station to a Scheduled mode of operation and transmitting the data from the mobile station on an assigned reverse channel.

In the preferred embodiment, when initiating the data transmission of scheduled mode, the mobile station transmits a Supplemental Channel Request Message and the reverse access channel is a Reverse Enhanced Access Channel. The acknowledgment indication is sent as part of a Supplemental Channel Assignment Message and further includes power control bits and data rate grant bits, where the power control bits and data rate grant bits are received by the mobile station on a Common Power Control Channel. Transmitting the data from the mobile station on the assigned reverse channel includes also transmitting mobile station buffer activity bits and a data rate request bit, and the method further includes receiving, from the base station, a power control bit, a data rate grant bit and an ACK/NACK indication. The data rate request bit is preferably transmitted as part of a dynamic buffer status report, and requests one of an increase in data rate, a decrease in data rate, or no change in the data rate, and the data rate grant bit is time multiplexed by the base station with the power control bit, and indicates one of a grant of the requested data rate or a denial of the requested data rate.

Also disclosed is a mobile station that includes an RF transceiver for conducting bidirectional wireless communications with a base station and a data processor that operates under the control of a stored program for, when the mobile station is in an Autonomous mode of operation, autonomously transmitting data from the mobile station to the base station on a reverse supplemental channel or a reverse access channel from the mobile station to the base station. The data processor is responsive to a reception of an acknowledgment indication from the base station that comprises a reverse channel assignment message for the mobile station, for switching the mobile station to a Scheduled mode of operation and for transmitting the data from the mobile station on an assigned reverse channel.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
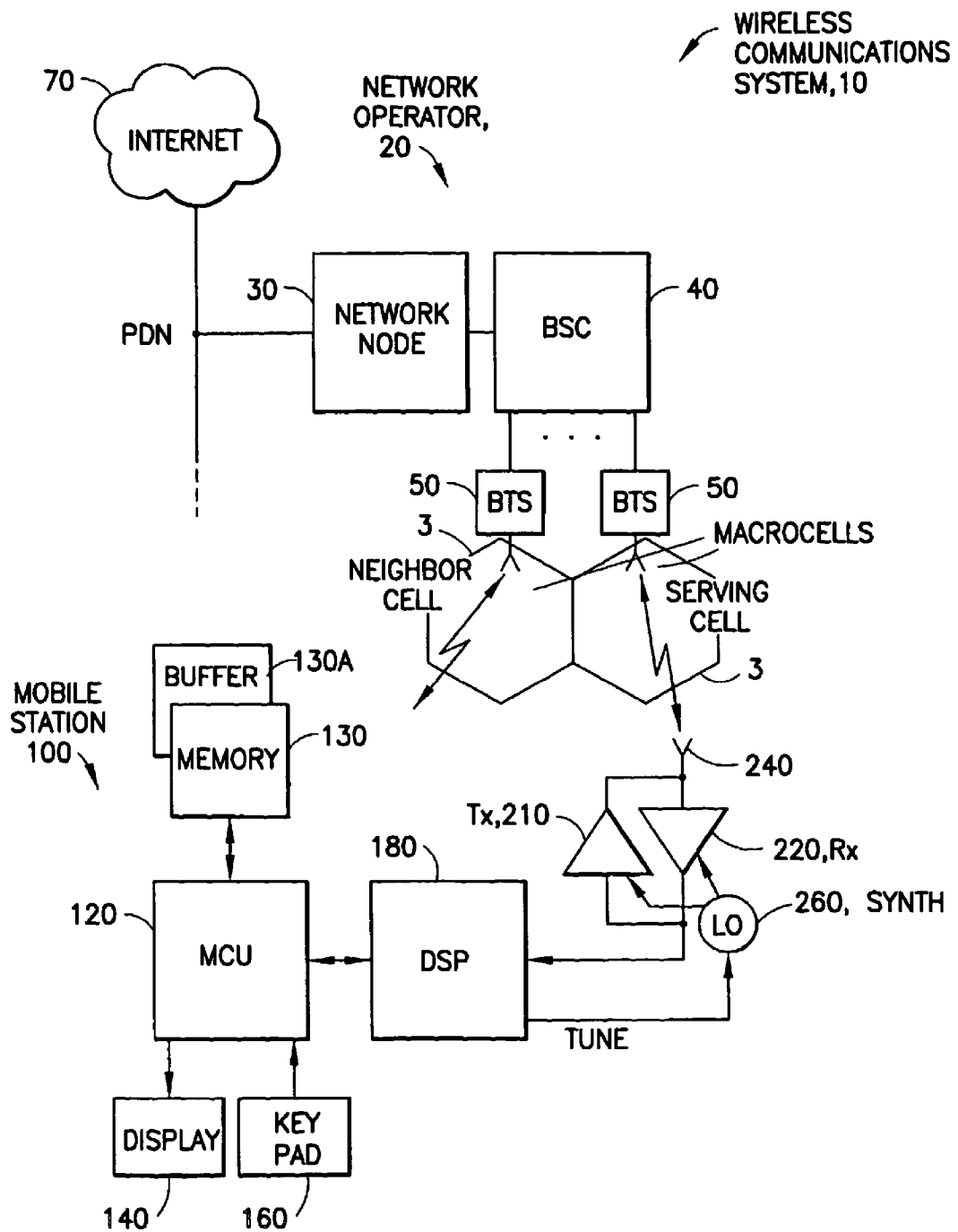
FIG. 1 is a simplified block diagram of a mobile communications system that is suitable for practicing the teachings of this invention.

By way of introduction, and referring to FIG. 1, there is shown as a simplified block diagram an embodiment of a wireless communications system 10 that is suitable for practicing this invention. The wireless communications system 10 includes at least one mobile station (MS) 100. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. In the presently preferred embodiment of this invention the air interface standard is compatible with a code division multiple access (CDMA) air interface standard, such as one known as cdma2000, although this is not a limitation upon the practice of this invention.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer 130A. The operating program is assumed, for the purposes of this invention, to enable the MCU 120 to execute the software routines, layers and protocols required to implement the methods in accordance with this invention, as described in detail below, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

The following discussion first describes a plurality of reverse supplemental channel (R-SCH) states and then describes state transitions. However, the teachings of this invention encompass all possible options for state design and state transitions. This invention also accommodates quality of service (QoS) needs for describing mode transitions.

Figure 2:
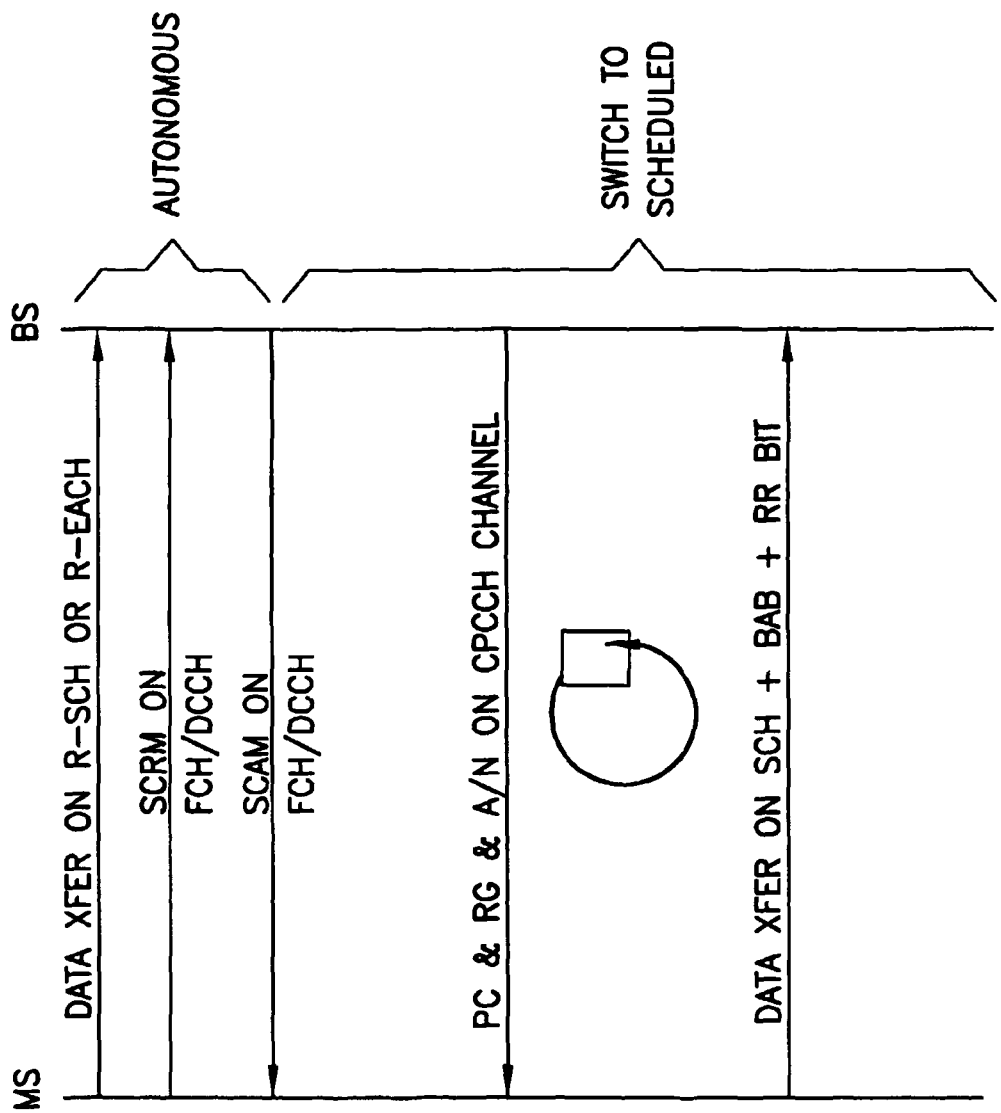
FIG. 2 is a diagram for illustrating a state transition from an autonomous transmission mode to a scheduled transmission mode.

As was stated earlier, an aspect of this invention is to enhance the reverse link (uplink) for IS2000 by the addition of a mode for the MS 100 to transition to scheduling transmissions when operating using autonomous transmissions. FIG. 2 depicts the scenario while the MS 100 is in the active state. The transition proceeds by the following Steps.

1. The MS 100 initiates data transfer on the R-EACH (Reverse Enhanced Access Channel) or Reverse Supplemental Channel. A SCRM (supplemental channel request message) can be transmitted over a reverse fundamental or reverse dedicated channel to request a scheduled mode operation, if the mobile station so desires.

2. If the BS 50 acknowledges the MS 100 transmission it sends an acknowledgment indicator (AI), if the reverse data is sent over the R-EACH in previous step. The base station also can send a SCAM (Supplemental Channel Assignment Message) for informing the MS 100 of its channel assignment over a forward fundamental or dedicated channel. In addition, the BS 50 sends, via the CPCCH (Common Power Control Channel), the PCB (power control bits), RGB (Rate Grant Bits), and the ACK/NAK bits. In response, the MS 100 transmits its data along with BAB (Buffer Activity bits), reflecting utilization of the data buffer 130A in FIG. 1, and RRB (Rate Request bits).

If the BS 50 does not acknowledge the MS 100 transmission, i.e., the MS 100 is denied permission to transmit, the MS 100 repeats Step 1.

3. Assuming that the MS 100 has permission to transmit, the MS 100 and BS 50 jointly "close the reverse data transmission loop" by the MS 100 sending its data, plus the BAB and RRB. The BS 50 responds with the PCB, the RGB and the appropriate one of ACK/NAK.

When the MS 100 is in a Control Hold state the MS 100 first transitions out of the Control Hold state prior to initiating the data transfer.

It can be appreciated that the use of this invention solves the previously described problem of the BS 50 not having knowledge of when the MS 100 needs to transmit data. By the use of this invention the MS 100 is permitted to autonomously initiate the data transmission process, followed by BS 50 control of whether the data transmission may continue (entering into scheduled mode). The use of this invention can thus be seen to reduce the delay associated with reverse link transmission (startup). Furthermore, since the BS 50 has control of whether to permit the MS 100 to continue data transmission, the BS 50 can control the ROT (Rise Over Thermal).

A more detailed description of this invention is now provided.

Figure 3:
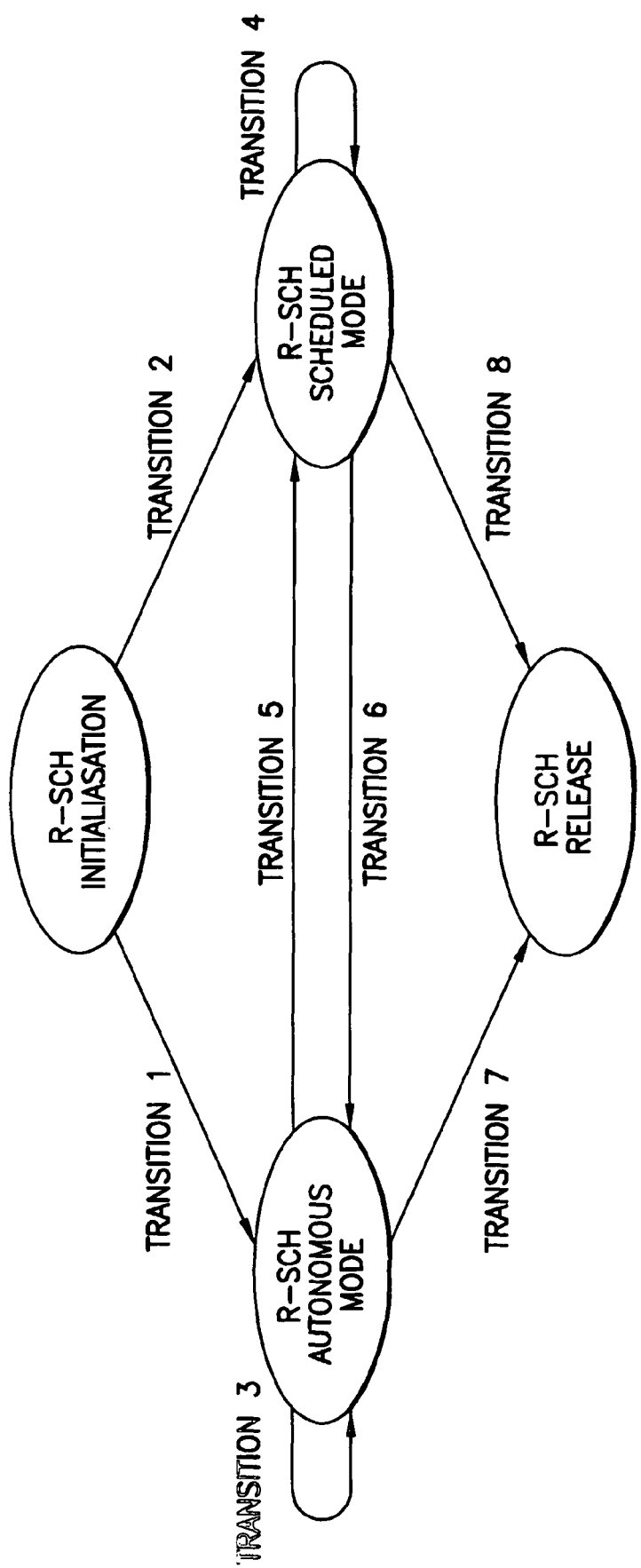
FIG. 3 is a state diagram that illustrates 1xEV-DV R-SCH states and transitions.

As is shown in FIG. 3, there are four R-SCH states/modes and eight transitions among these states/modes in cdma2000 1xEV-DV. Note that the terminologies of "state" and "mode" are interchangeable in the ensuing discussion. The four states are the R-SCH initialization state, the R-SCH autonomous state, the R-SCH scheduled state, and R-SCH release state. These are now described in further detail.

A. R-SCH Initialization State

There are various possible (optional) ways to initialize the R-SCH in cdma2000 1xEV-DV.

Option 1:

The MS 100 sends a Supplemental Channel Request Message (SCRM) over the R-DCCH/R-FCH to the BS. The BS 50 acknowledges with Extended Supplemental Channel Assignment Message (ESCAM) over F-FCH/F-DCCH/F-PDCH. This is same as a conventional cdma2000 1xRTT approach.

Option 2:

The MS 100 sends a Supplemental Channel Request Mini Message (SCRMM) over the R-DCCH/R-FCH to the BS 50. The BS 50 acknowledges with a Supplemental Channel Assignment Mini Message (SCAMM) over the F-FCH/F-DCCH/F-PDCH/F-CACH. This is also the same as the conventional 1xRTT approach.

Option 3:

The MS 100 sends a modified Supplemental Channel Request Message (SCRM) over the R-DCCH/R-FCH to the BS 50. The BS 50 acknowledges with a modified Extended Supplemental Channel Assignment Message (ESCAM) over the F-FCH/F-DCCH/F-PDCH/. The modified SCRM includes additional parameters such as the MS 100 buffer status, transmit power, QoS level and the MS 100 preferred mode of R-SCH operation (either Autonomous or Scheduled mode). The modified ESCAM transmitted by the BS 50 includes additional parameters such as the MAC_ID (medium access control ID) to identify the MS 100 for R-SCH access, and the bit positions of control information (e.g. PC, RG, and A/N) in a power control subchannel (i.e., the F-FCH, F-DCCH, or F-CPCCH).

It should be noted that the MAC_ID can be the same as the MAC_ID for the F-PDCH, if the F-PDCH exists for the MS 100. Also, the MAC_ID in SCAM can be replaced with a mapping identifier serving as a reverse link R-SCH access ID.

Option 4:

The MS 100 sends the Supplemental Channel Request Message (SCRM) over the R-DCCH/R-FCH to the BS 50 (as in Option 1 above). The BS 50 acknowledges with a modified Extended Supplemental Channel Assignment Mini Message (ESCAMM) over the F-FCH/F-DCCH/F-PDCH/F-CACH. The ESCAMM includes parameters as in the modified ESCAM of Option 3.

Option 5:

The MS 100 sends a request over the R-EACH with additional parameters. The additional parameters specify the R-SCH characteristic and its preferred mode of operation.

R-SCH Autonomous Mode

In this mode of operation, the MS 100 can access the R-SCH without prior authorization. The operation in this mode has two options.

Option 1:

For fixed/constant data rate applications, all active MSs 100 can send data over the R-SCH autonomously using a data rate established by any of the following rules:

(1) at a lowest data rate, i.e. 9.6 kbps, (2) at a low fixed data rate that is configurable by the BS 50, or (3) at a minimum rate that is dynamically agreed upon by the MS 100 and the BS 50. For example, the data rate may be negotiated between the MS 100 and BS 50 by exchanging QoS BLOB according to IS-2000.5 procedures.

It is noted that all active MSs 100 should have been assigned with a MAC_ID in the R-SCH initialization state or in the F-PDCH assignment phase. The MAC_ID is used by the BS 50 to distinguish between multiple autonomous mode MSs 100. However, the BS 50 also can distinguish multiple autonomous mode MSs 100 by decoding the MS 100 long code, without having knowledge of the MAC_ID.

This option can be used to advantage for short frame transmission or low data rate applications.

Option 2:

Similar to the cdma2000 1xEV-DO (also referred to as HDR), the MS 100, along with the R-SCH user traffic transmission, can explicitly send Rate Indication information over a reverse channel to indicate the data rate that is being used in the present R-SCH frame. The reverse Rate Indication channel may be a separate dedicated Walsh-coded channel, a common channel, or a channel that is time-multiplexed with other channels.

R-SCH Scheduled Mode

There are two options available for the R-SCH scheduled mode.

Option 1:

Similar to cdma2000 1xRTT, the R-SCH procedures and relevant messages are used. The MS 100 requests R-SCH channel assignment, and the BS 50 schedules and assigns a R-SCH channel with a specific data rate and time duration.

Option 2:

For variable data rate applications, the following mode of operation can also be considered as a "semi-scheduled" mode.

MS 100 Procedures:

The MS 100 begins with the autonomous mode at a low data rate, as defined above. While sending data over the R-SCH, the MS 100 also sends a "Data Rate Request" to the BS 50. The Data Rate Request has the following characteristics. The Data Rate Request is 1-bit of information with three-state modulation (i.e., −1, 0, and 1), and it may be carried over an uplink overhead dedicated or common channel, or it may be carried over the R-SCH with a special Multiplexing option, where the MS 100 traffic and control information are multiplexed. The Data Rate Request may also be reflected in the MS 100 dynamic buffer status, QoS level and transmit power report to the BS 50. In other words, the Data Rate Request bit can be referred to as the BAB (buffer activity bit). The definition of the Data Rate Request is as follows:

If BAB=INCREASE=1, the MS 100 is requesting to transmit on the R-SCH at the data rate of (current data rate+incremental rate), where the incremental rate=increased step rate, If BAB=DECREASE=−1, the MS 100 is requesting to transmits on the R-SCH at the data rate of (current data rate−decremented rate), If BAB=CONSTANT=0, the MS 100 is requesting to transmit on the R-SCH at the same data rate as the current data rate.

BS 50 Procedures:

Upon receiving the Data Rate Request of one of INCREASE/DECREASE/CONSTANT from the MS 100, the BS 50 acknowledges (i.e., it either grants or denies) the MS 100 with a 1-bit information (feedback) of GRANT/DENY. This 1-bit information has the following characteristics. It is carried over the power control sub-channels within the F-FCH, F-DCCH, or F-CPCCH, and is time-multiplexed with the power control bit (in F-FCH, F-DCCH, or F-CPCCH) and other control information. For higher transmission reliability of this bit, bit repetition may be used by the BS 50. A definition of the GRANT/DENY bit is as follows.

If the 1-bit feedback=GRANT=1, the BS 50 allows the MS 100 BAB request.

If the 1-bit feedback=DENY=−1, the BS 50 denies the MS 100 BAB request.

Figure 4:
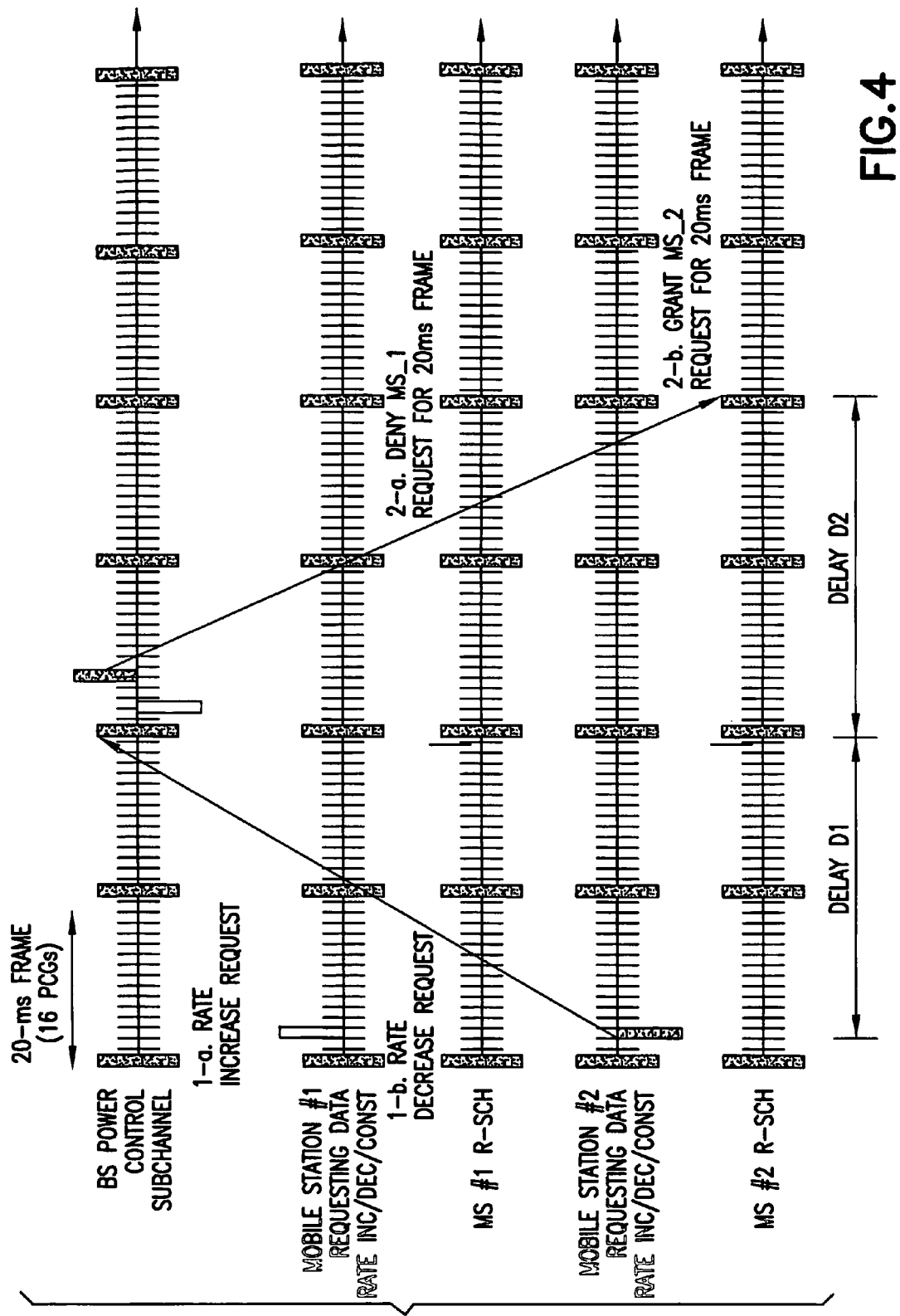
FIG. 4 is a timing diagram that illustrates timing relationships between data rate request and grant, where the delays D1 and D2 are configurable by the base station.

The autonomous data rate request (by the MS 100) and the grant (by the BS 50) have a certain timing relationship. FIG. 4 illustrates one non-limiting example of the timing relationship. Special notes for the timing relationship shown in FIG. 4 are as follows.

For Step 1-a (top trace) and 1-b (second to top trace), at any Power Control Group (PCG), where there are 16 PCGs in one 20 ms frame) any MS 100 (e.g. MS 100 #1 or MS 100 #2) can request to increase, decrease, or maintain the data rate. After Delay time D1, the BS 50 receives and processes the request. The BS 50 sends the acknowledgment to MS 100 at the designated PCG. After Delay time D2, the MS 100 starts transmitting on the R-SCH at the data rate that is agreed upon with the BS 50. The rate control can be "per PCG" or "per frame", and the value of D1 and D2 is controlled or configured by the BS 50.

R-SCH Release State

This state can be similar to that of cdma2000 1xRTT.

R-SCH State/Mode Transitions

The events (or methods) for the eight transitions shown in the state diagram of FIG. 2 are described as follows.

Transition 1: The preferred mode of operation is embedded in the (modified) R-SCH assignment (mini) message.

Transition 2: The preferred mode of operation is embedded in the (modified) R-SCH assignment (mini) message.

Transition 3: For Option 1, the MS 100 remains in the Autonomous mode when it is continuing transmission at the low (or lowest) data rate. For Option 2, the MS 100 remains in the Autonomous mode when the reverse rate indication indicates a legitimate data rate (instead of a mode switch indication).

Transition 4: The MS 100 remains in the Scheduled Mode so long as there is no new mode switch request in the SCRM, or the MS 100/BS 50 still operate based on the data rate request-grant "scheduled" procedures defined herein.

Transition 5: For Option 1, the preferred mode of operation is embedded in the (modified) R-SCH assignment (mini) message. For Option 2, the transition trigger may be implemented with the QoS level, with higher QoS needs corresponding to the Scheduled Mode and its transition.

Transition 6: For Option 1, the R-SCH-assigned duration timer is used as the trigger, i.e., after the duration of the scheduled transmission, the MS 100 reverts back to the Autonomous Mode. For Option 2, the preferred mode of operation is embedded in the (modified) R-SCH assignment (mini) message. For Option 3, the transition trigger may be implemented with the QoS level model, with lower QoS needs corresponding to the Autonomous Mode and its transition.

Transition 7: This can be similar to 1xRTT, using R-SCH release messages and procedures.

Transition 8: This can also be similar to 1xRTT, using R-SCH release messages and procedures.

As has been described, for the cdma2000 1xEV-DV reverse link framework it is desirable to support both the Autonomous and the Scheduled Modes of operation for the R-SCH. The foregoing discussion of the invention has described each R-SCH state and state transition in detail, and furthermore applies equally to other possible state designs and state transitions. The QoS parameters can be used to support the presently preferred state transitions.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method comprising: when a mobile station is in an autonomous mode of operation, autonomously transmitting data from the mobile station to a base station on a reverse channel; in response to receiving an acknowledgment indication from the base station, that comprises a reverse channel assignment message for the mobile station, switching the mobile station to a scheduled mode of operation, where, while in the scheduled mode, the mobile station provides data transmission power information and data transmission buffer status information as a request to transmit data and a buffer activity bit as a data rate request bit; and transmitting data from the mobile station on an assigned reverse channel.

2. A method as in claim 1, where transmitting from the mobile station to the base station to initiate the data transmission comprises transmitting a supplemental channel request message.

3. A method as in claim 1, where the reverse channel comprises one of a reverse enhanced access channel, a reverse fundamental channel, and a reverse dedicated channel.

4. A method as in claim 2, where the acknowledgment indication comprises a supplemental channel assignment message.

5. A method as in claim 4, where the acknowledgment indication further comprises power control bits and data rate grant bits.

6. A method as in claim 5, where the power control bits and data rate grant bits are received by the mobile station on a common power control channel.

7. A method as in claim 1, further comprising receiving, from the base station, a power control bit, a data rate grant bit and an acknowledgment/non-acknowledgment indication.

8. A method as in claim 7, where the data rate request bit is transmitted as part of a dynamic buffer status report, and requests one of an increase in data rate, a decrease in data rate, or no change in the data rate.

9. A method as in claim 8, where the data rate grant bit indicates one of a grant of the requested data rate or a denial of the requested data rate.

10. A method as in claim 1, wherein the buffer activity bit is a single bit.

11. A method as in claim 1, wherein the buffer activity bit is arranged to undergo three-state modulation.

12. An apparatus, comprising:

an RF transceiver for conducting bidirectional wireless communications with a base station; and a data processor operating under the control of a stored program for, when the apparatus is in an autonomous mode of operation, autonomously transmitting from the apparatus to the base station on a reverse channel, said data processor being responsive to a reception of an acknowledgment indication from the base station, that comprises a reverse channel assignment message for the apparatus, for switching the apparatus to a scheduled mode of operation and for transmitting data from the apparatus on an assigned reverse channel, where, while in the scheduled mode, the apparatus provides data transmission power information and data transmission buffer status information as a request to transmit data and a buffer activity bit as a data rate request bit.

13. An apparatus as in claim 12, where when transmitting from the apparatus to the base station to initiate the data transmission the data processor transmits a supplemental channel request message.

14. An apparatus as in claim 12, where the reverse channel comprises one of a reverse enhanced access channel, a reverse fundamental channel, and a reverse dedicated channel.

15. An apparatus as in claim 13, where the acknowledgment indication comprises a supplemental channel assignment message.

16. An apparatus as in claim 15, where the acknowledgment indication further comprises power control bits and data rate grant bits.

17. An apparatus as in claim 16, where the power control bits and data rate grant bits are received by the apparatus on a common power control channel.

18. An apparatus as in claim 12, where said data processor is further responsive for receiving, in response from the base station, a power control bit, a data rate grant bit and an acknowledgment/non-acknowledgment indication.

19. An apparatus as in claim 18, where the data rate request bit is transmitted as part of a dynamic buffer status report, and requests one of an increase in data rate, a decrease in data rate, or no change in the data rate.

20. An apparatus as in claim 19, where the data rate grant bit indicates one of a grant of the requested data rate by the base station or a denial of the requested data rate.

21. An apparatus as in claim 12, where the apparatus and the base station communicate over a reverse synchronous code division, multiple access channel.

22. An apparatus as in claim 12, wherein the apparatus is a mobile station.

23. An apparatus as in claim 12, wherein the buffer activity bit is a single bit.

24. An apparatus as in claim 12, wherein the buffer activity bit is arranged to undergo three-state modulation.

25. A method comprising:
when a mobile station is in an autonomous mode of operation, autonomously transmitting from the mobile station to a base station to initiate a data transmission from the mobile station to the base station, the transmission comprising a supplemental channel request message that is transmitted over a reverse enhanced access channel or a reverse supplemental channel;
receiving an acknowledgment indication from the base station over a common power control channel, the acknowledgment indication comprising a supplemental channel assignment message comprising power control bits and data rate grant bits;
in response to receiving the acknowledgment indication from the base station, switching the mobile station to a scheduled mode of operation;
transmitting data packets from the mobile station over a reverse supplemental channel, further comprising transmitting mobile station buffer activity bits and a data rate request bit, and
receiving, from the base station in response, a power control bit, a data rate grant bit and an acknowledgment/non-acknowledgment indication, wherein there exist at least four reverse supplemental channel states and at least eight transitions between the reverse supplemental channel states, wherein the at least four reverse supplemental channel states include a reverse supplemental channel initialization state, a reverse supplemental channel autonomous state, a reverse supplemental channel scheduled state, and a reverse supplemental channel release state.

26. A method as in claim 25, where the data rate request bit is transmitted as part of a dynamic buffer status, quality of service level and transmit power report, and requests one of an increase in data rate, a decrease in data rate, or no change in the data rate.

27. A method as in claim 26, where the data rate grant indicates one of a grant of the requested data rate or a denial of the requested data rate.

28. A method comprising:
executing one of a plurality of techniques to generate a reverse supplemental channel initialization state, comprising one of,
sending a modified supplemental channel request message from a mobile station to a base station, and receiving from the base station an acknowledgement as a modified extended supplemental channel assignment message, where the modified supplemental channel request message comprises at least one of mobile station buffer status, transmit power, quality of service level and a preferred mode of reverse supplemental channel operation, said preferred mode of reverse supplemental channel operation being one of an autonomous mode or a scheduled mode, and where the modified extended supplemental channel assignment message comprises information to identify the mobile station;
sending a supplemental channel request message to the base station, and receiving from the base station an acknowledgement as a modified extended supplemental channel assignment mini message, where the extended supplemental channel assignment mini message comprises the information to identify the mobile station; and
sending a request over a reverse enhanced access channel, where the request comprises parameters that specify at least the preferred mode of reverse supplemental channel operation; and
after executing the reverse channel initialization state and when operating the mobile station with the base station, transmitting data packets from the mobile station on the reverse supplemental channel, where there are at least four reverse supplemental channel states and at least eight transitions between the reverse supplemental channel states, where the at least four reverse supplemental channel states comprise a reverse supplemental channel initialization state, a reverse supplemental channel autonomous state, a reverse supplemental channel scheduled state, and a reverse supplemental channel release state.

29. A method as in claim 28, where in the reverse supplemental channel autonomous state, the mobile station accesses the reverse supplemental channel without prior authorization, and comprises, for constant data rate applications, one of:

sending data over the reverse supplemental channel autonomously using a data rate established by one of a plurality of rules, where the mobile station is identified using at least one of medium access control identification mobile station information, that is used by the base station to distinguish between multiple autonomous mode mobile stations, and a mobile station long code; and explicitly sending rate indication information over a reverse channel to indicate the data rate that is being used in a present reverse supplemental channel frame.

30. A method as in claim 29, where in the reverse supplemental channel autonomous state, and when operating with a variable data rate, the mobile station operates in a semi-scheduled mode by initially starting in the autonomous mode at a current data rate, and while sending data over the reverse supplemental channel, the mobile station sends a data rate request to the base station for indicating one of a request to transmit on the reverse supplemental channel at a data rate of current data rate plus incremental rate, a request to transmit on the reverse supplemental channel at a data rate of current data rate minus decremented rate, or a request to transmit on the reverse supplemental channel at the current data rate.

31. A method as in claim 30, where the data rate request comprises 1-bit of information with three-state modulation that is sent over one of an uplink overhead dedicated channel, a common channel, the reverse supplemental channel using a multiplexing option, or in a mobile station dynamic buffer status, quality of service level and transmit power report to the base station.

32. A method as in claim 30, where the base station is responsive to a receipt of the data rate request from the mobile station to either grant or deny the mobile station data rate request using grant/deny feedback information.

33. A method as in claim 32, where the grant/deny feedback information is sent to the mobile station over power control sub-channels and is time-multiplexed with power control information.

34. A method as in claim 30, where reverse supplemental channel state/mode transitions between the reverse supplemental channel initialization state, the reverse supplemental channel autonomous state, the reverse supplemental channel scheduled state and the reverse supplemental channel release state occur as follows:

when transitioning from the reverse supplemental channel initialization state to the reverse supplemental channel autonomous state,
the preferred mode of operation is embedded in a modified reverse supplemental channel assignment mini message;

when transitioning from the reverse supplemental channel initialization state to the reverse supplemental channel scheduled state, the preferred mode of operation is embedded in the modified reverse supplemental channel assignment mini message;

for a transition from the reverse supplemental channel autonomous state to remain in the reverse supplemental channel autonomous state, and in accordance with a first operational mode of operation, the mobile station remains in the reverse supplemental channel autonomous state while transmitting at the initial data rate, and in accordance with a second operational mode of operation, the mobile station remains in the autonomous state when a reverse data rate indication indicates a legitimate data rate as opposed to an indication to switch to the reverse supplemental channel scheduled state;

for a transition from the reverse supplemental channel scheduled state to remain in the reverse supplemental channel scheduled state, the mobile station remains in the reverse supplemental channel scheduled state so long as there is at least not a new mode switch request in the supplemental channel request message;

for a transition from the reverse supplemental channel autonomous state to the reverse supplemental channel scheduled state, and in accordance with the first operational mode of operation, the preferred mode of operation is embedded in the modified reverse supplemental channel assignment mini message, and in accordance with the second operational mode of operation, a state transition trigger is implemented with the quality of service level;

for a transition from the reverse supplemental channel scheduled state to the reverse supplemental channel autonomous state, and in accordance with the first operational mode of operation, a reverse supplemental channel assigned duration timer is used as the state transition trigger such that after the duration of the scheduled transmission, the mobile station reverts back to the reverse supplemental channel autonomous state, in accordance with the second operational mode of operation, the preferred mode of reverse supplemental channel operation is embedded in the modified reverse supplemental channel assignment mini message, and in accordance with a third operational mode of operation, the state transition trigger is implemented with the quality of service level; and for transitions to the reverse supplemental channel release state from the reverse supplemental channel autonomous and scheduled states, reverse supplemental channel release messages and procedures are used.

35. A method as in claim 34, where for the transition from the reverse supplemental channel autonomous state to the reverse supplemental channel scheduled state in accordance with the second operational mode of operation, the state transition trigger is implemented by an increase in a required reverse supplemental channel level, and for the transition from the reverse supplemental channel scheduled state to the reverse supplemental channel autonomous state in accordance with the third operational mode of operation, the state transition trigger is implemented by a decrease in a required quality of service level.

36. A method comprising:
when a mobile station is in an autonomous mode of operation, autonomously transmitting data from the mobile station to a base station on a reverse channel;
the mobile station receiving an assignment message from the base station, the assignment message comprising an acknowledgment/non-acknowledgment indication, power control bits, and data rate grant bits;
in response to receiving an acknowledgment indication from the base station, switching the mobile station to a scheduled mode of operation; and
transmitting data from the mobile station to the base station over a reverse supplemental channel, wherein there exist at least four reverse supplemental channel states and at least eight transitions between the reverse supplemental channel states, wherein the at least four reverse supplemental channel states include a reverse supplemental channel initialization state, a reverse supplemental channel autonomous state, a reverse supplemental channel scheduled state, and a reverse supplemental channel release state.

37. A mobile station, comprising:

an RF transceiver for conducting bidirectional wireless communications with a base station; and a data processor operating under the control of a stored program for, when the mobile station is in an autonomous mode of operation, autonomously transmitting from the mobile station to the base station on a reverse channel, the mobile station receiving an assignment message from the base station, the assignment message comprising an acknowledgment/non-acknowledgment indication, power control bits, and data rate grant bits, said data processor being responsive to a reception of an acknowledgment indication from the base station for switching the mobile station to a scheduled mode of operation and for transmitting data from the mobile station to the base station over a reverse supplemental channel, wherein there exist at least four reverse supplemental channel states and at least eight transitions between the reverse supplemental channel states, wherein the at least four reverse supplemental channel states include a reverse supplemental channel initialization state, a reverse supplemental channel autonomous state, a reverse supplemental channel scheduled state, and a reverse supplemental channel release state.

38. A method comprising:

when a mobile station is in an autonomous mode of operation, autonomously transmitting from the mobile station to a base station to initiate a data transmission from the mobile station to the base station, the transmission comprising a supplemental channel request message that is transmitted over a reverse channel;

in response to receiving an acknowledgment indication from the base station, switching the mobile station to a scheduled mode of operation;

transmitting data from the mobile station to the base station over a reverse supplemental channel, wherein there exist at least four reverse supplemental channel states and at least eight transitions between the reverse supplemental channel states, further comprising transmitting mobile station buffer activity bits and a data rate request bit, and receiving, from the base station in response, a power control bit, a data rate grant bit and an acknowledgment/non-acknowledgment indication, wherein the at least four reverse supplemental channel states include a reverse supplemental channel initialization state, a reverse supplemental channel autonomous state, a reverse supplemental channel scheduled state, and a reverse supplemental channel release state.

39. A mobile station, comprising:

a transceiver for receiving and transmitting signals;

a signal processor coupled to the transceiver;

a controller coupled to the signal processor, the controller receiving information from the signal processor derived from the signal processor and providing information to the signal processor to be converted for transmission through the transceiver, wherein the mobile station comprises an autonomous mode and a scheduled mode, wherein, in the autonomous mode, the mobile station is configured to transmit data at a selected data transmission rate to the base station over a reverse supplemental channel, wherein, in the scheduled mode, the mobile station is configured to transmit a request by providing data transmission power information and selected data transmission buffer status information to the base station for granting a data transmission rate to the mobile station, wherein there exist at least four reverse supplemental channel states and at least eight transitions between the reverse supplemental channel states, wherein the at least four reverse supplemental channel states include a reverse supplemental channel initialization state, a reverse supplemental channel autonomous state, a reverse supplemental channel scheduled state, and a reverse supplemental channel release state.

* * * * *